United States Patent Office 2,940,254
Patented June 14, 1960

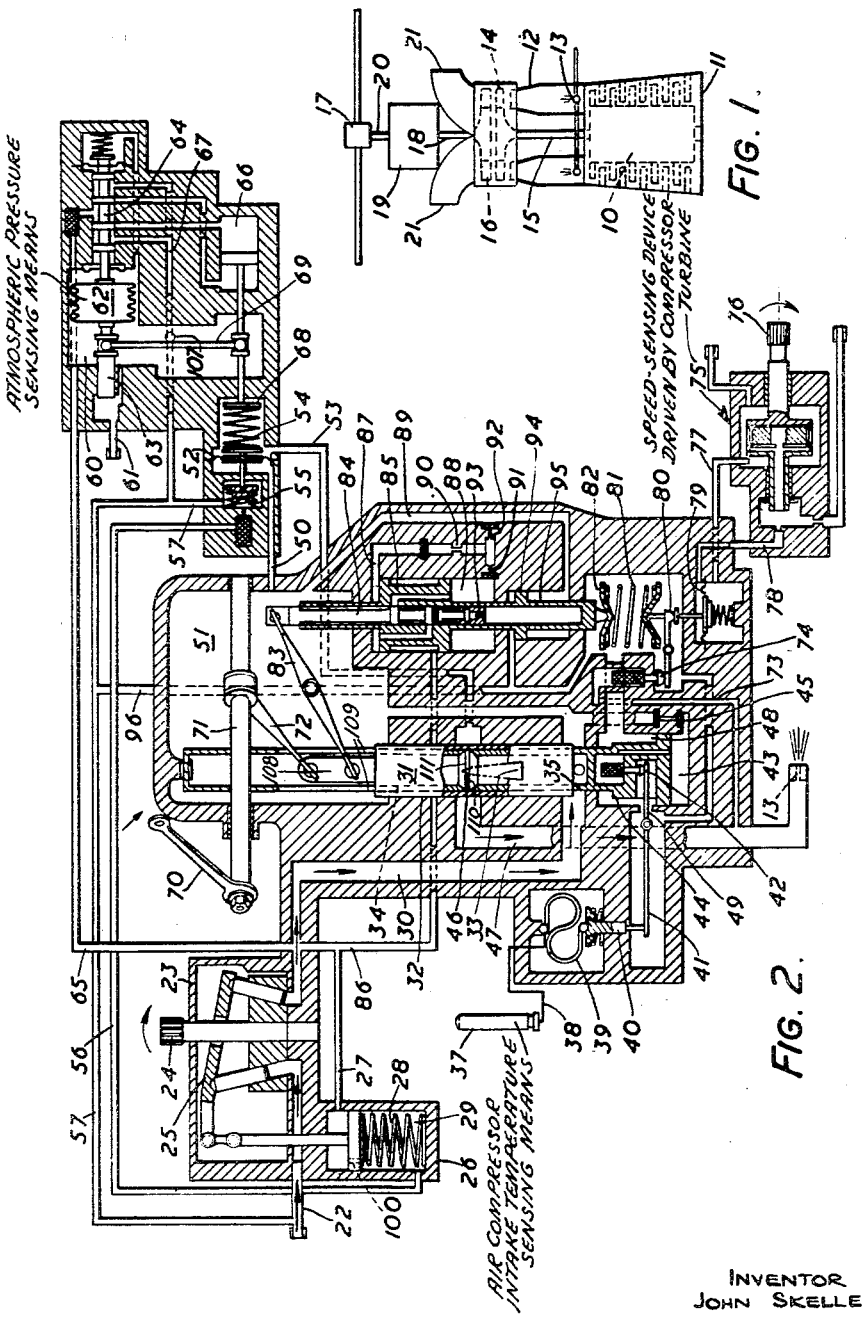

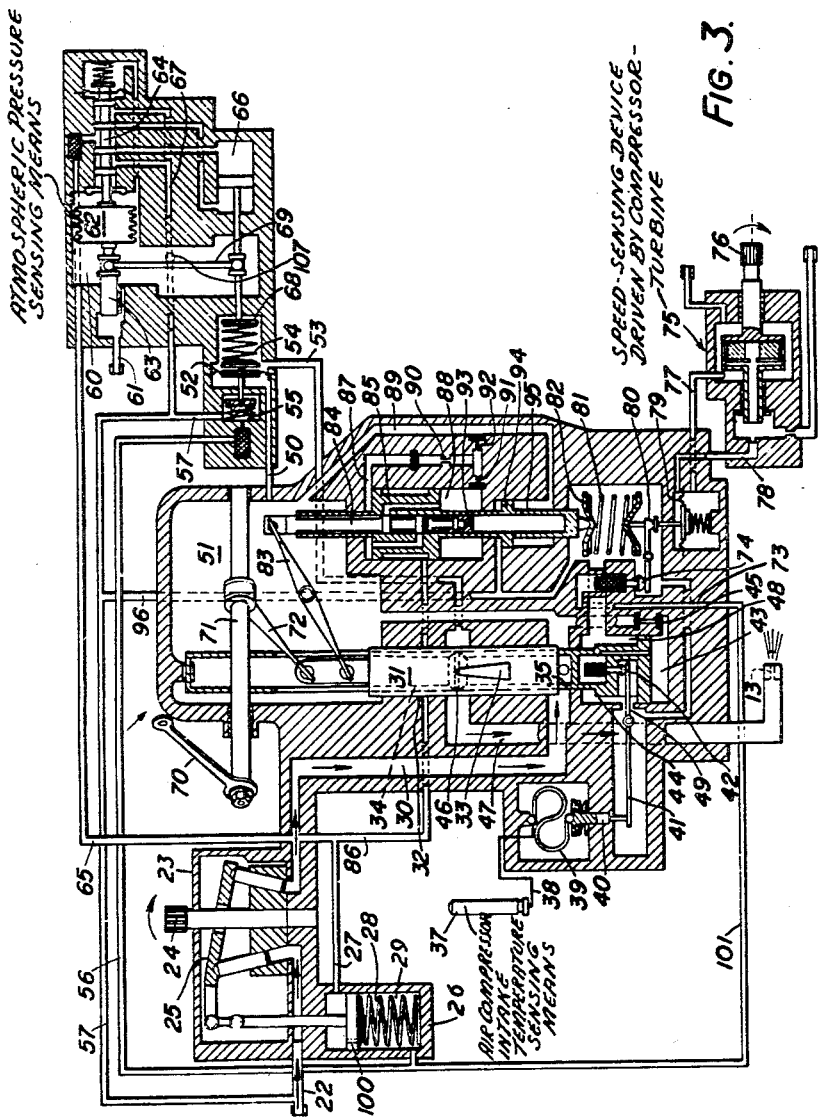

1

2,940,254

CONTROL SYSTEMS FOR GAS TURBINE POWER UNITS FOR AIRCRAFT

John Skellern, Northolt, England, assignor to D. Napier & Son Limited, London, England, a company of Great Britain Filed Apr. 3, 1957, Ser. No. 650,355

Claims priority, application Great Britain Apr. 13, 1956

5 Claims. (Cl. 60—39.16)

This invention relates to control systems for gas turbine power units for aircraft, of the kind having a compressor-turbine set and a separate power turbine which provides useful output. For instance, in a "turbo-prop" power unit the power turbine would drive an airscrew while in the case of a helicopter it would drive the helicopter rotor.

In a gas turbine power unit it is necessary, for efficient operation, to provide accurate control over the rotational speed of the compressor. In the case of power units in which one turbine drives the compressor and also provides useful output e.g. a single shaft "turbo-prop" unit, this control can be effected by means of a constant speed variable pitch airscrew which automatically adjusts the airscrew pitch to maintain the compressor speed constant at the desired value. In the case of power units in which the compressor-turbine set is separate from the power turbine, such control over the speed of the compressor is not obtainable since there is no direct connection between the airscrew and the compressor-turbine set, and it is an object of the present invention to provide a simple and effective control system for such a gas turbine power unit.

According to the present invention, in a control system for a gas turbine power unit having a compressor-turbine set which is separate from the power turbine there is a single control lever any given setting of which corresponds to a particular speed of the compressor-turbine set irrespective of variations in ambient conditions tending to alter this speed, the control lever adjusting a metering device for the fuel supply and automatic compensating devices being provided which are responsive to variations in ambient conditions and which apply compensating corrections to the fuel supply such that at any given setting of the control lever the thus metered and compensated fuel supply (herein referred to as the "scheduled fuel supply") is in excess of that required to produce the speed of the compressor-turbine set corresponding to the control lever setting, and there is a variable datum speed-sensitive device the datum of which is controlled by the control lever and which is responsive to a difference between the actual speed of the compressor-turbine set and the datum and which "trims" the scheduled fuel supply (i.e. applies a further adjustment to the scheduled fuel supply) in the sense of reducing this difference.

If the control lever merely metered the fuel supply in dependence on the position in which the control lever was set, it would not necessarily provide accurate control over the speed of the compressor-turbine set because variations in ambient conditions, e.g. the temperature and pressure of the air at the compressor intake, could produce variations in the speed. Automatic compensating devices responsive to such variable ambient conditions go a long way towards completely compensating the fuel supply as metered in response to the control lever setting, and will hold the speed of the compressor-turbine set much closer to the desired value as set by the control lever. However, there is a possibility of lag and error in the response of these devices, and there may be other variables, such as the effects of fluctuations in the speed of the power turbine, for which automatic compensating devices are not provided but which may also affect the speed of the compressor-turbine set. The present invention, by providing an additional control over the fuel supply based on deviations of the speed of the compressor-turbine set from the required speed as set by the control lever, ensures that the speed of the compressor-turbine set is held very close to the required value.

It is, of course, well known to control the fuel supply to an engine by means of a governor responsive to the engine speed, but in such arrangements as hitherto employed the governor has virtually controlled the whole of the fuel supply. In the present invention the speed-sensitive device has only to "trim off" the excess quantity of the fuel supply scheduled by the control lever and the automatic compensating devices. Moreover, in a turbine power unit for aircraft, such automatic compensating devices are in any case necessary for certain operating conditions when the speed-sensitive device is inoperative, e.g. at starting.

The variable datum speed-sensitive device may "trim" the scheduled fuel supply in any convenient manner, and in one form of the invention it operates a valve for spilling off some of the scheduled fuel before the scheduled fuel reaches the burners of the power unit. In other forms the speed-sensitive device may operate to control the amount of fuel being scheduled, such as by controlling the delivery of a fuel pump.

In one form of the invention the control lever is connected to the variable-datum speed-sensitive device through a servo motor arranged to provide a delayed action such that the rate of change of the datum produced by a movement of the control lever conforms to the rate of change of speed of the power unit in response to the said movement. If the response characteristics of the power unit differ during acceleration and deceleration, the servo motor may be arranged to provide different rates of change of the datum for acceleration and deceleration.

The invention may be performed in various ways and two particular forms of control system embodying the invention will now be described by way of example with reference to the accompanying drawings, in which:

Figure 1 is a side view of a gas turbine power unit for a helicopter to which the control systems embodying the invention are applied;

Figure 2 is a diagram showing the essential parts of one form of the control system; and Figure 3 is a diagram showing the essential parts of another form of control system.

Referring to Figure 1, the gas turbine power unit to which the control system of the present invention is applied is mounted in a helicopter with its rotational axis substantially vertical. The power unit comprises an axial flow compressor 10 which draws in air from the atmosphere through an intake 11 at the bottom, compresses this air, and discharges it into a plurality of combustion chamber cans 12. Fuel burners 13 are provided in the combustion chambers 12, through which fuel is injected for combustion in the compressed air. The hot combustion gases are then partially expanded in a turbine 14. This turbine is connected by a shaft 15 to the compressor 10 for driving the latter, the parts 10, 14 and 15 constituting the compressor-turbine set. The combustion gases are then further expanded in a power turbine 16, which is not mechanically coupled to the compressor-turbine set. The power turbine 16 is connected to the rotor 17 of the helicopter through a shaft 18, reduction gearing 19 and a shaft 20. The expanded combustion gases are discharged to the atmosphere through exhaust ducts 21.

Fuel is supplied to the burners 13 by means of a fuel control system illustrated in a simplified form in Figure 2. The fuel control system is shown in Figure 2 with only those features which are essential to an understanding of the invention.

In the fuel control system illustrated in Figure 2 filtered fuel is delivered through a pipe 22 into a fuel pump 23. The fuel pump 23 is driven by the compressor turbine 14 (see Figure 1) through an auxiliaries drive which drives the pump shaft 24 at a rotational speed proportional to the rotational speed of the compressor turbine 14. The pump 23 is of a known kind, the stroke of which can be adjusted by means of a tiltable plate 25, the inclination of which, and hence the pump plunger stroke and the pump delivery, can be adjusted by means of a hydraulic servo motor 26. The upper side of the piston of this servo motor is subjected to pump delivery pressure through a pipe 27 which tends to lower the piston and decrease the stroke of the pump, this effect being opposed by a spring 28 and by the pressure of fuel contained in the space 29 below the piston. The pressure in the space 29 is controlled by bleeding fuel therefrom in a manner to be described. Fuel enters the space 29 through an orifice or bleed 100 which by-passes the piston.

The fuel delivered by the pump 23 passes through a passage 30 into a metering unit 31. This unit comprises an outer sleeve 32 having an upward extension 108 and provided with a tapering aperture 33, a stationary upper inner sleeve 34 provided with slots 109 in its upper portion, and a movable lower inner sleeve 35. The lower inner sleeve 35 is raised or lowered in response to changes in the temperature of the air at the inlet 11 of the compressor 14. This temperature is sensed by a bulb 37 which is disposed adjacent the air intake 11 (Figure 1) and which is filled with mercury and is connected by means of a capillary tube 38 with a Bourdon tube 39. The arrangement is such that, as the temperature sensed by the bulb 37 increases, so the Bourdon tube 39 uncurls and depresses a plunger 40. This plunger acts through a lever 41 on a half-ball bleed valve 42 which controls the pressure in a space 43 below a servo motor piston 44 attached to the inner lower sleeve 35. The space 43 is connected through a restricted orifice 45 with the passage 30 so that when the half-ball valve 42 is closed the pressure in the space 43 is equal to the pump delivery pressure. On the other hand, when the half-ball valve 42 is opened to bleed off some fuel from the space 43, the pressure in this space will fall, causing the servo motor piston 44 and the inner lower sleeve 35 to descend. Movement of the inner lower sleeve 35 varies the size of a metering orifice 46 defined as to its lateral dimension by the sides of the tapering aperture 33 in the outer sleeve 32, and as to its vertical dimension by the distance of the upper edge 110 of the lower inner sleeve 35 from the lower edge 111 of the stationary upper inner sleeve 34. The fuel scheduled by passing through the metering orifice 46 enters a passage 47 leading to the burners 13. The space 48 above the servo motor piston 44 is maintained at the pressure of the metered fuel by means of a connection 49 communicating with the passage 47.

The pressure drop of fuel across the metering orifice 46 is controlled by adjusting the stroke of the fuel pump 23. This is done by taking a pressure tapping 50 from the space 51 above the metering unit 31, which space is filled with fuel at the pump delivery pressure since fuel introduced into the metering unit through the passage 30 can freely enter the space 51 through the upper inner sleeve 34. This pressure is applied to one side of a diaphragm 52. To the other side of the diaphragm 52 there is applied a pressure corresponding to that of the scheduled fuel, this pressure being applied by means of a passage 53 communicating with the scheduled fuel passage 47. The diaphragm 52 is also subjected to a force exerted by a spring 54 in a manner to be described. The diaphragm 52 controls a half-ball bleed valve 55 which permits fuel to bleed off from the space 29 beneath the piston of the pump servo 26 through a pipe 56. The fuel thus bled off returns to the pump inlet pipe 22 through a pipe 57. Assuming for the moment that the load on the spring 54 remains constant, then any temporary increase in the pressure of the fuel delivered by the pump 23 would cause the diaphragm 52 to move slightly to the right, thereby increasing the bleed of fuel through the half-ball valve 55 and reducing the stroke and the delivery of the pump. Conversely, a temporary reduction in the pressure of the fuel delivered by the pump would bring about an increase in the pump stroke. Likewise, a temporary increase in pressure of the scheduled fuel would increase the delivery of the pump to maintain a constant pressure drop across the orifice 46 while a temporary reduction in the pressure of the scheduled fuel would cause a reduction in the stroke of the pump. Thus so long as the load on the spring 54 remains constant there will be a constant pressure drop across the metering orifice 46 and the scheduled fuel will be fully compensated as to ambient air temperature, since the size of the metering orifice 46 will be automatically adjusted by means of the lower inner sleeve 35 in response to changes in temperature sensed at the compressor intake 11 by the bulb 37.

The scheduled fuel is also required to be compensated in dependence on ambient air pressure. This is done by adjusting the pressure drop across the metering orifice 46 in dependence on the ambient air pressure, the loading of the spring 54 being adjusted in accordance with this pressure. This is achieved by introducing the pressure at the compressor intake 11 into a chamber 60 by means of a pipe 61 leading from the intake 11. The chamber 60 contains a bellows 62 one end of which is mounted on an abutment 63 and the other end of which is connected to a bobbin valve 64. This valve is fully pressure balanced. The valve 64 has lands which control the admission of high pressure fuel from a pipe 65 into a servo motor 66, and the discharge of fuel from this servo motor through a pipe 67 leading to the pipe 57 which returns to the inlet side of the pump 23. The piston of the servo motor 66 is connected to an abutment 68 of the spring 54 which in part controls the half-ball valve 55. The said piston is also connected by means of a lever 69, which is pivoted on a fixed fulcrum 107, to the abutment 63 of the bellows 62 to provide a neutralizing feedback whereby the positions of the said piston and of the spring abutment 68, and consequently the loading of the spring 54, will be a function of the pressure in the chamber 60. The loading of the spring 54 influences the pressure drop across the metering orifice 46 by adjusting the stroke of the fuel pump 23 by controlling the bleed through the half-ball valve 55 as previously described. Thus the scheduled fuel in the passage 47 is compensated for changes in compressor intake pressure as well as for changes in compressor intake temperature.

The scheduled fuel in the passage 47 as delivered to the burners 13 is also directly influenced by a power lever 70 under the control of the pilot. This lever is connected to a shaft 71 which is in turn connected by means of an arm 72 with the extension 108 of the outer sleeve 32 of the metering unit, so that the height of the sleeve 32 and hence the lateral dimension of the metering orifice 46 defined by the sides of the tapering slot 33 in the sleeve 32 are directly dependent upon the position of the pilot's lever 70. By virtue of these controls the amount of fuel injected through the burners 13 is such that each position of the pilot's lever 70 very nearly corresponds to a particular rotational speed of the compressor-turbine set. With the compensation provision so far described this corelation would not be exact, however, since the rotational speed of the compressor-turbine set may be affected by other uncompensated factors such as the load upon the power turbine 16. Accordingly, an additional automatic compensation is imposed upon the supply of fuel to the burners 13. The characteristics of the control system as so far described are so adjusted that the amount of fuel passing through the metering orifice 46 is slightly in excess of the amount required to drive the compressor-turbine set at the speed appropriate to the setting of the pilot's lever 70. This small surplus amount of fuel is "trimmed-off" in accordance with the invention in the following manner.

A spill pipe 73 is provided communicating with the scheduled fuel passage 47. This spill pipe leads to a half-ball valve 74, the amount of fuel spilled through this valve being controlled by means of a variable-datum speed-sensitive device. One part of this device comprises a unit 75 which is driven through a shaft 76 from the power unit auxiliaries drive at a speed proportional to the rotational speed of the compressor-turbine set. This device is arranged to create a pressure differential between two pipes 77 and 78 which is directly proportional to the rotational speed of the shaft 76. A suitable device 75 for this purpose is described in the present applicant's United States of America patent application Ser. No. 631,924, now Patent No. 2,865,624.

The pressure differential between the pipes 77 and 78 is applied across a diaphragm 79 which acts on one end of a lever 80 in opposition to the loading of a spring 81. Assuming for a moment that the loading of the spring 81 is constant, then the inclination of the lever 80 and consequently the amount of fuel spilled through the half-ball valve 74 will be dependent upon the pressure differential in the pipes 77 and 78 and consequently upon the rotational speed of the shaft 76 which, as previously mentioned, is proportional to the rotational speed of the compressor-turbine set. Consequently, for any given loading of the spring 81 the amount of fuel spilled from the scheduled fuel passage 47 will be dependent upon the extent by which the rotational speed of the shaft 76 differs from a predetermined speed corresponding to the loading of the spring 81.

Since the position of the pilot's lever 70 is required to determine the actual rotational speed of the compressor-turbine set, it is necessary that the loading of the spring 81 should depend upon the setting of the pilot's lever 70. To this end the position of the upper abutment 82 of the spring 81 is determined by the position of the pilot's lever 70. This is achieved by connecting one end of a lever 83 to the extension 108 of the outer sleeve 32 of the metering unit, the position of which sleeve depends upon the position of the pilot's lever 70 as previously described. The lever 83 actuates a control valve 84 which determines the position of a follow-up servo motor piston 85. Fuel is supplied under pressure to this servo motor through a pipe 86 and, depending upon the position of the valve 84 in relation to the piston 85, is admitted either to the space 87 above the piston 85 or to the space 88 below it. The opposite end space is vented to the space 51 through a bleed 90 or 91 as the case may be, through a bleed 92, and through a passage 89. An additional bleed 93 is provided in communication with the valve 84 in order to provide a differential rate of response for the servo motor piston 85, depending upon whether the valve 84 is being raised or lowered. The servo motor piston 85 is provided with an auxiliary piston 94 to provide a biasing force. An extension 95 from the piston 85 acts upon the upper abutment 82 of the spring 81. When the position of the pilot's lever 70 is changed, the loading of the spring 81 is likewise altered, the rate of change of the loading being determined by the sizes of the various bleeds 90, 91, 92 and 93 which are selected to suit the response characteristics of the power unit. Thus, the amount of fuel spilled from the scheduled fuel passage 47 through the spill passage 73 is adjusted in dependence on the position of the pilot's lever 70 and on the actual speed of rotation of the compressor-turbine set, any deviation of the latter speed from the speed as set from the pilot's lever 70 being automatically corrected by a corresponding adjustment of the amount of fuel spilled. The spilled fuel is returned to the inlet side of the pump 23 through a passage 96 communicating with the pipe 57.

In another form of control system illustrated in Figure 3 the arrangement is very similar in most respects to the arrangement described with reference to Figure 2 except that in this case the half-ball valve 74 which serves to trim the scheduled fuel supply does not effect this trimming by spilling surplus fuel from the scheduled fuel supply but serves to trim the scheduled fuel supply by modifying the delivery of the fuel pump 23. This is achieved by providing a pipe 101 connecting the space 29 beneath the piston of the pump servo 26 to the half-ball valve 74. All other parts of Figure 3 are the same as the corresponding parts of Figure 2.

As previously indicated, the control system will in practice generally include additional features which are known in themselves.

What I claim as my invention and desire to secure by Letters Patent is:

1. A control system for a gas turbine power unit having fuel burners, a power turbine, and a compressor-turbine set separate from said power turbine, said control system comprising a control lever, a fuel pump, a fuel delivery line from said fuel pump to said burners, a fuel metering device in said fuel line intermediate said fuel pump and said burners, an operative connection between said control lever and said metering device to adjust said metering device in dependence on the setting of said control lever, automatic compensating devices responsive to variations in ambient atmospheric conditions and which apply such compensating corrections to the fuel supply that at all settings of said control lever the supply of scheduled fuel issuing from said metering device is in excess of that required to produce a rotational speed of said compressor-turbine set corresponding to the setting of said control lever, a variable-datum speed-sensitive device, an operative connection between said speed-sensitive device and said compressor-turbine set for causing said speed-sensitive device to sense the actual speed of said compressor-turbine set, means for adjusting the datum of said variable-datum speed-sensitive device in dependence on the setting of said control lever, and means responsive to a difference between the actual speed of said compressor-turbine set as sensed by said speed-sensitive device and the datum of said speed-sensitive device adapted to trim said scheduled fuel supply in the sense of reducing said speed difference.

2. A control system according to claim 1 having a spill valve for spilling off fuel from said fuel line between said metering device and said burners, and an operative connection between said variable-datum speed-sensitive device and said spill valve.

3. A control system according to claim 1 in which said fuel pump is a variable stroke pump including means adapted to adjust the stroke of said pump, and in which there is an operative connection between said variable-datum speed-sensitive device and said fuel pump stroke adjusting means.

4. A control system according to claim 1 in which said operative connection between said control lever and said variable-datum speed-sensitive device includes a servo motor, said servo motor having delayed action means adapted to retard the rate of change of said datum due to a movement of said control lever to conform to an acceptable rate of change of speed of said compressor-turbine set in response to said movement.

5. A control system according to claim 4 in which said servo motor has a delayed action device operative in one direction of movement of said control lever and a second delayed action device operative in the opposite direction of movement of said control lever, said delayed action devices having different time delay characteristics.

References Cited in the file of this patent

UNITED STATES PATENTS

| | | |
|---|---|---|
| 2,786,331 | Williams | Mar. 26, 1957 |
| 2,818,703 | Victor | Jan. 7, 1958 |
| 2,867,084 | Criswell | Jan. 6, 1959 |